July 3, 1962 K. MAAZ 3,042,854

HALL-VOLTAGE GENERATOR

Filed Sept. 23, 1958

United States Patent Office 3,042,854

Patented July 3, 1962

3,042,854
HALL-VOLTAGE GENERATOR

Karl Maaz, Nurnberg, Germany, assignor to Siemens-Schuckertwerke Aktiengesellschaft, Berlin-Siemensstadt, Germany, a corporation of Germany Filed Sept. 23, 1958, Ser. No. 762,824
1 Claim. (Cl. 323—94)

My invention relates to Hall voltage generating devices applicable for amplifying, modulating, computing, controlling or regulating purposes.

Such Hall generators comprise a ferro-magnetic core structure with a field gap in which a resistance member, the so-called Hall plate, is located so as to be subjected to the magnetic field of the core structure. The Hall plate has two terminals for connecting it into a current supplying circuit and is also provided with two Hall electrodes at respective points spaced from both terminals on opposite sides of the plate so as to have the same electric potential when the magnetic field has zero intensity. When the magnetic field assumes a finite magnitude, a voltage appears between the Hall electrodes, and this "Hall voltage" is proportional to the product of the magnetic field strength times the current flowing between the terminals of the Hall plate.

It has been found that in such Hall generators, particularly in cases where the field gap has a width of 0.1 mm. or more, an error voltage, aside from any residual voltage due to hysteresis of the magnetic circuit, remains between the Hall electrodes even when the field winding of the magnetic core, serving to produce the magnetic field, is not excited. Thus, a Hall generator used for amplifying purposes exhibits a disturbing Hall voltage when the magnetic field winding, forming the input circuit of the amplifier, is not traversed by current while a control current is passing through the Hall plate. In Hall modulators in which the current flowing through the Hall plate between its terminals is alternating, the above-mentioned error voltage superimposes itself upon the modulated output current as a direct-voltage component.

It is an object of my invention to devise means for eliminating the above-mentioned error voltages in Hall generators.

My invention is based upon the recognition that the cause of the above-mentioned error voltages resides in magnetic field effects caused by the control currents flowing through the Hall plate. Accordingly, for achieving the abovementioned object, and in accordance with a feature of my invention, I provide additional magnetic-field producing conductor means so poled and connected with the control circuit of the Hall plate as to be traversed by currents that correspond to the control current flowing through the Hall plate and are preferably proportional thereto.

According to another feature of the invention, the auxiliary conductor means form one or several turns about the magnetic field structure or constitute a portion of the winding used for exciting the field structure.

According to still another feature, the supply leads for passing the control current through the Hall plate are subdivided and located in loop relation to each other so that their respective magnetic effects relative to the Hall plate balance and compensate each other.

The additional conductor means may be traversed by the control currents themselves in parallel or series connection, it being readily possible to dimension or adjust the currents flowing through the conductor means so as to obtain the desired compensation of the error field caused by the control current. The conductor means can also be made adjustable as regards their location in space for calibrating purposes. Another way is to provide resistors, such as variable rheostats or potentiometers, which are connected in parallel or series relation with the control-current circuit of the Hall plate.

The invention will be more fully explained in the following with reference to the embodiments of Hall generators according to the invention illustrated by way of example on the accompanying drawing in which.

The same reference characters are applied in all illustrations to corresponding elements respectively.

Figure 2:
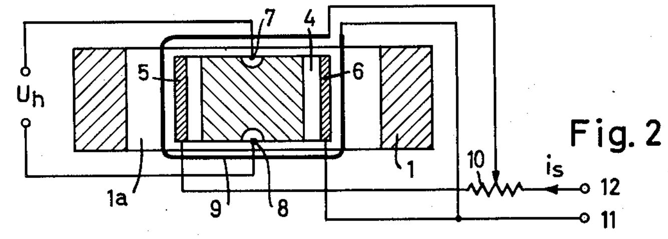
FIG. 2 is a sectional view corresponding to the section line II—II indicated in FIG. 1, FIGS. 3 and 4 illustrate different modifications respectively of generators equipped with a field system and otherwise similar to that shown in FIG. 1.
Figure 1:
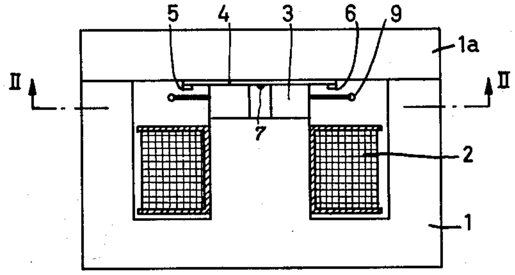
FIG. 1 is a front view of a Hall generator.

As shown in FIGS. 1 and 2, the device comprises a field system composed of an E-shaped core structure 1 and a generally I-shaped yoke portion 1*a*, both consisting of ferromagnetic material of high permeability, such as laminated or compressed-powder material. The center leg of core portion 1 carries a field winding 2. A Hall plate 4 is mounted on yoke portion 1*a* in face-to-face contact therewith but electrically insulated therefrom. The effective area of the Hall plate 4 is covered by a ferromagnetic pole piece 3 consisting of the same material as the core portions 1 and 1*a*. The pole piece 3 is likewise insulated from the Hall plate 4 and forms, together with the yoke portion 1*a*, a narrow field gap in which the Hall plate is located so that the thickness of the Hall plate is substantially the same as the width of the air gap.

The Hall plate 3 consists essentially of a wafer of semiconductor material preferably indium antimonide or indium arsenide. It is provided with two terminal electrodes 5 and 6 consisting of any suitable contact metal, preferably indium. The Hall plate is further provided with two Hall electrodes 7 and 8 both located midway between the terminal electrodes 5 and 6 on opposite sides respectively of the Hall plate.

The electrodes 5 and 6 of the Hall plate are connected at terminals 11 and 12 to a current source so that during operation of the device the Hall plate 4 is traversed by a control current passing between electrodes 5 and 6. When under these conditions the magnetic field core 2 is not excited, the two Hall electrodes 7 and 8 are supposed to have the same potential so that the Hall voltage $U_h$ between them is zero. When the field winding 2 is excited, the two Hall electrodes 7 and 8 assume respectively different potentials and the Hall voltage $U_h$ then has a finite value as explained above.

In the embodiment of FIGS. 1 and 2, an auxiliary winding 9 formed of one or several turns displaced around the pole piece 3 is connected in parallel relation to the control circuit of the Hall plate 4 by means of an adjustable resistor 10. The above-mentioned error voltages caused by disturbing field effects of the control current can be compensated by properly adjusting the resistor 10.

Figure 3:
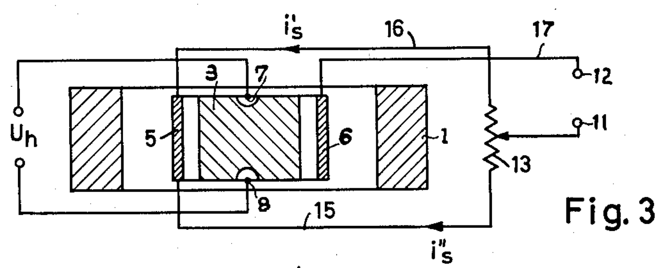
Figure 4:
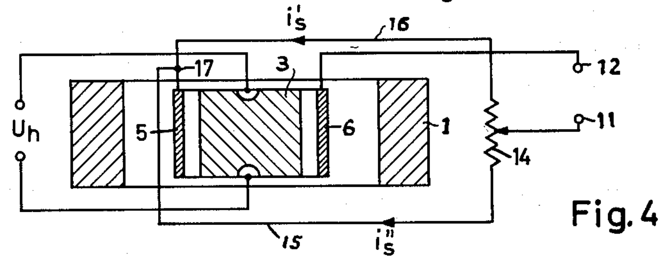

In the embodiments of FIGS. 3 and 4, the current supply terminal 12 of the device is connected with terminal electrode 6 by a single lead 17, whereas the other current supply terminal 11 is connected through a rheostat 13 or 14 with two parallel leads 16 and 15 that are both attached to the terminal electrode 5 so as to carry two component currents $i'_s$ and $i''_s$ which produce respective magnetic fields of mutually opposed directions. By means of the potentiometer rheostat 13 or 14, the field components of these two currents can be adjusted to the same magnitudes so that they cancel each other.

While according to FIG. 3 the lead 15 is directly connected to the electrode 5 on the side opposite to the point where the lead 16 is connected to the same electrode, FIG. 4 shows a modification in which the connection between the leads 15 and 16 is made at a point 17 spaced from the terminal electrode 5.

I claim:

A Hall generator, comprising a magnetic-field structure having a substantially E-shaped core portion and a yoke portion mounted on said core portion, said core portion having a center leg forming a field gap together with said yoke portion, a Hall plate located in said gap and having a pair of contact electrodes and a pair of Hall electrodes defining respective axes within a plane transverse to the direction of the field in said gap, an excitation winding disposed on said center leg, a compensating winding also disposed on said center leg, a current supply circuit connected to said contact electrodes for passing energizing current through said Hall plate, and means connecting said compensating winding with said circuit for energizing said compensating winding in proportion to the current in said circuit and minimizing error voltages across said Hall electrodes due to the current supplied to said Hall plate.

References Cited in the file of this patent

UNITED STATES PATENTS

| | | |
|---|---|---|
| 2,594,939 | Leete | Apr. 29, 1952 |
| 2,812,389 | Dervitz | Nov. 5, 1957 |
| 2,814,015 | Kuhrt | Nov. 19, 1957 |